United States Patent [19]
Miura

[11] Patent Number: 5,901,831
[45] Date of Patent: May 11, 1999

[54] ARTICLE TRANSFER MECHANISM

[75] Inventor: Shinya Miura, Yawara-mura, Japan

[73] Assignee: SMC Corporation, Tokyo, Japan

[21] Appl. No.: 08/767,336

[22] Filed: Dec. 16, 1996

[30] Foreign Application Priority Data

Jan. 12, 1996 [JP] Japan ................................ 8-021957

[51] Int. Cl.[6] ................................................ B65G 35/00
[52] U.S. Cl. ........................... 198/619; 104/155; 104/156
[58] Field of Search ............................ 198/619; 104/155, 104/156; 285/24, 27

[56] References Cited

U.S. PATENT DOCUMENTS

| | | | |
|---|---|---|---|
| 4,207,807 | 6/1980 | Takata et al. ........................... | 92/128 |
| 4,488,477 | 12/1984 | Miyamoto ........................... | 198/619 |
| 4,744,287 | 5/1988 | Miyamoto ........................... | 92/13.7 |
| 5,388,526 | 2/1995 | Imai ........................... | 198/619 |
| 5,537,929 | 7/1996 | Miura et al. ........................... | 198/619 |
| 5,564,339 | 10/1996 | Miura et al. ........................... | 104/156 |
| 5,613,421 | 3/1997 | Abe ........................... | 92/165 PR |
| 5,826,701 | 10/1998 | Miura ........................... | 198/619 |
| B1 4,488,477 | 3/1991 | Miyamoto ........................... | 198/619 |

Primary Examiner—James W. Keenan
Assistant Examiner—Thuy V. Tran
Attorney, Agent, or Firm—Oblon, Spivak, McClelland, Maier & Neustadt, P.C.

[57] ABSTRACT

A rodless cylinder type article transfer mechanism employing a cylinder tube which is composed of a series of tube members which are successively connected by direct fitting engagement or by fitting engagement through joint sleeves. The cylinder tube is provided with, at least at one end thereof, an end tube member which is releasable and displaceable axially toward an end block over a distance at least two times as long as a length of fitting engagement of said tube members.

4 Claims, 5 Drawing Sheets

ARTICLE TRANSFER MECHANISM

BACKGROUND OF THE INVENTION

1. Field of the Art

This invention relates to an article transfer mechanism utilizing a rodless cylinder.

2. Prior Art

Generally, a rodless cylinder type article transfer mechanism is basically constituted by a cylinder tube consisting of a number of tube members which are successively connected in the axial direction, end blocks which supports the opposite ends of the cylinder tube, a piston slidably fitted in the cylinder tube, a reciprocating carriage which is movable back and forth along the outer periphery of the cylinder tube, and a magnetic coupling provided between the piston and the carriage to couple them by magnetic attraction. As the piston is driven by compressed air which is supplied to the cylinder tube through a port in an end block, the carrier follows the movement of the piston to transfer a work on the carrier.

The tube members which constitute the cylinder tube are connected to adjacent tube members either by direct fitting engagement of a fitting portion 2b of one tube member 2, which is reduced in outside diameter, with a fitting portion 2a of an adjoining tube member 2, which is enlarged in inside diameter, through seal members 4 as shown in FIG. 8, or by fitting engagement with a joint sleeve 3 of fitting portions 2a of adjacent tube members 2, which are enlarged in inside diameter, through seal members 4 as shown in FIG. 9. Accordingly, the connected tube members 2 can be disconnected from each other when the two tube members parted away from each other in the axial direction over such a distance as would be necessary for bringing the two tube members out of fitting engagement with each other or with the joint sleeve 3.

There have been problems with conventional article transfer mechanisms of this sort in that, when it becomes necessary to dismantle the carrier and piston from the cylinder tube for check-out in maintenance and service, for example, at least one of the end blocks has to be disconnected and removed firstly to free one end of the cylinder tube for extraction of the carrier and piston. Besides, when there arises a necessity for removing one tube member from the cylinder tube, similarly one end block has to be dismantled to move the tube member in the axial direction for disengagement from an adjacent tube member.

However, as a matter of fact, the end block in question is connected with various pneumatic components or parts and a large number of pipes, which are in turn connected with various peripheral units. Therefore, the dismantling of the end block usually entails laborious and troublesome jobs involving disconnections of all of these associated components, units and pipes. In addition, the dismantling of the end block is more difficult in case the article transfer mechanism is incorporated into a larger system in such a way as to make disconnection of associated component units difficult.

SUMMARY OF THE INVENTION

It is a primary object of the present invention to provide a rodless cylinder type article transfer mechanism which can facilitate the maintenance and service, permitting to remove a tube member or members from a cylinder tube assembly without necessitating to disconnect an end block, for example, at the time of dismantling a reciprocating carriage and a piston from the cylinder tube.

In accordance with the present invention, the above-stated objective is achieved by the provision of a rodless cylinder type article transfer mechanism with a cylinder tube having at least an end tube member axially displaceably supported on an end block at one end of the cylinder tube. The end tube member is axially displaceable over a distance which is at least two times longer than an axial length of its fitting engagement with an adjacent tube member or with a joint sleeve which connects the end tube member with an adjacent tube member.

In the article transfer mechanism as arranged above, after displacing the end tube member toward the end block, an extractable tube member in a second position or in a position next to the end tube member can be displaced in the direction of the end tube member over a predetermined necessary distance for disengaging same from a tube member in a third position. Thus, the extractable tube member of the cylinder tube can be removed without disconnecting the end block from associated components and pipes. At this time, if the carriage and piston are located on the extractable tube member, they can be removed together with the extractable tube member.

Thus, the maintenance and service of the transfer mechanism becomes quite easy because dismantling of tube members and other associated components of the cylinder tube is possible without dismantling the end block to which many pneumatic component units are attached.

In a more specific form of the present invention, the above-mentioned end block is provided with a cylindrical support member which also serves as a compressed air supply conduit for the cylinder tube. The end tube member is hermetically and slidably fitted in the cylindrical support member, and releasably stopped in a predetermined position by a stopper means which releasably fastens the end tube member in position.

Further, according to the present invention, the above-mentioned carriage is provided with a housing which encases a magnetic coupling member and which is separable from the latter by axial displacement along the cylinder tube.

As a consequence, the magnetic coupling member alone can be dismantled together with the extractable tube member whenever the carriage housing itself does not require maintenance and service.

The above and other objects, features and advantages of the invention will become apparent from the particular following description of the invention, taken in conjunction with the accompanying drawing which show by way of example preferred embodiments of the invention.

BRIEF DESCRIPTION OF THE INVENTION

DESCRIPTION OF PREFERRED EMBODIMENTS

Figure 1:
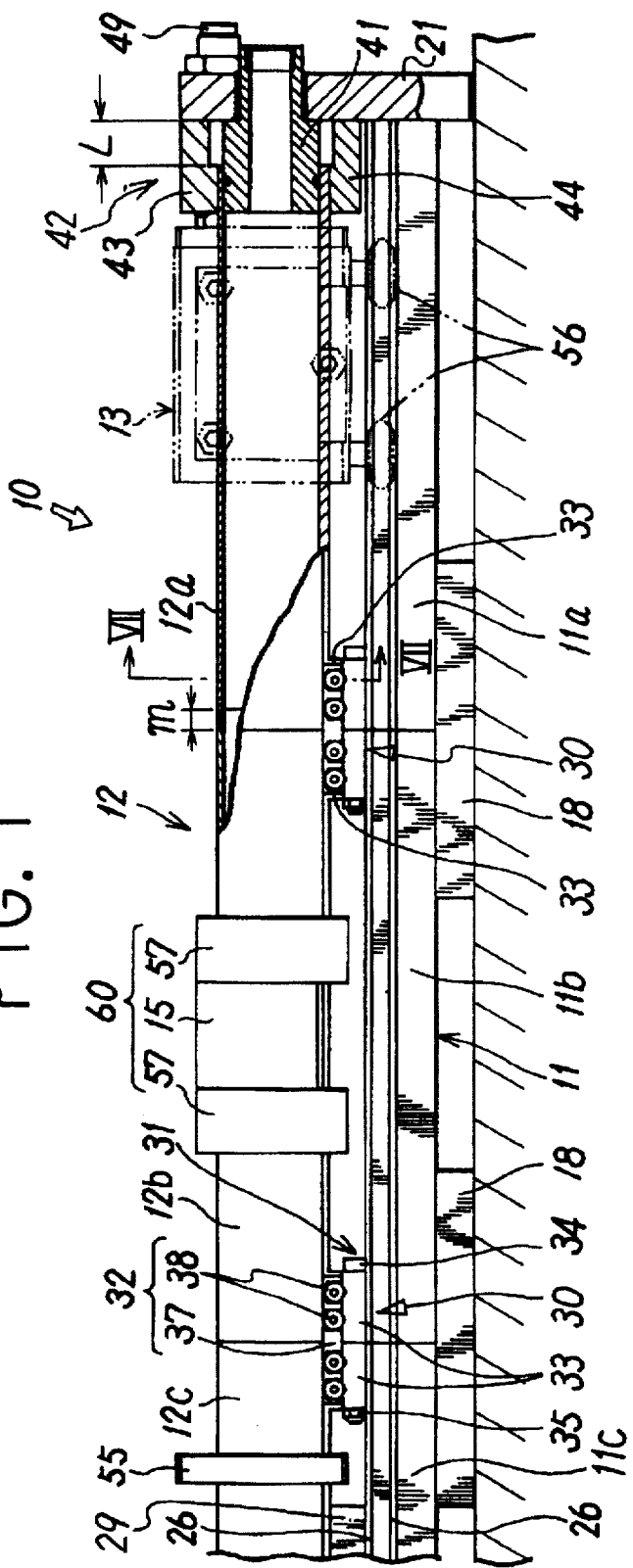
FIG. 1 is a partly sectioned front view of a rodless cylinder type article transfer mechanism embodying the present invention.
Figure 2:
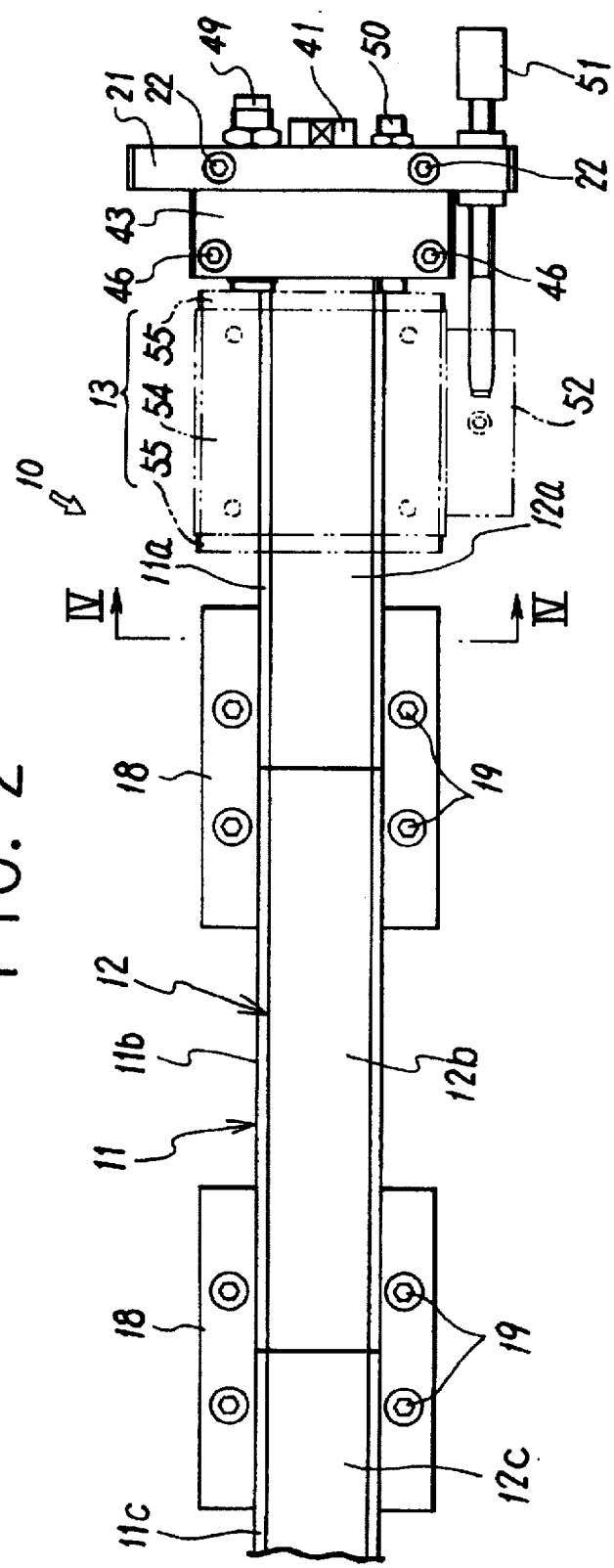
FIG. 2 is a schematic plan view of the transfer mechanism.
Figure 3:
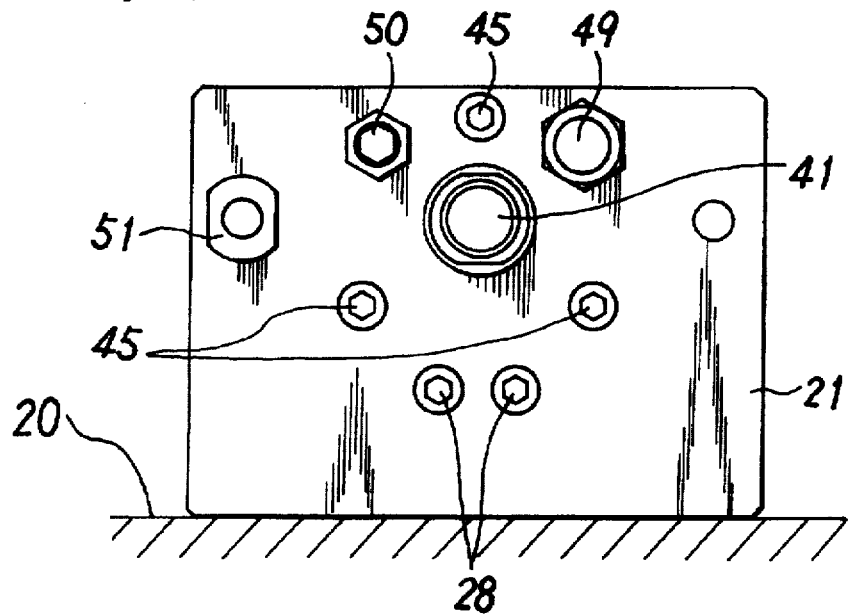
FIG. 3 is a schematic end view of the same transfer mechanism.

Referring to the accompanying drawings and first to FIGS. 1 through 4, there is shown an article transfer mechanism 10 which includes a hollow cylinder tube 12, a guide rail 11 which supports the cylinder tube 12 from beneath, end blocks 21 which support the opposite ends of the cylinder tube 12, a piston 14 which is hermetically slidable within the cylinder tube 12 (see FIG. 5), a carriage 13 which is movable back and forth in the axial direction along the outer periphery of the cylinder tube 12, and coupling magnets 15 (FIG. 5) which are mounted opposingly on the piston 14 and carriage 13 for coupling them by their magnetic attraction to each other.

The above-mentioned cylinder tube 12 is formed by successively connecting a plural number of cylindrical tube members 12a, 12b, 12c ... 12n in a predetermined length in the axial direction. Similarly, the guide rail 11 is formed by connecting a plural number rial members 11a, 11b, 11c ... 11n in a predetermined length in the axial direction.

At the respective joined ends, the rail members 11a, 11b, 11c ... 11n are supported on base blocks 18 which are fixed in position on a machine bed 20 by bolts 19.

The end blocks 21 are also fixed in position on the machine bed 20 by means of bolts 22.

Figure 4:
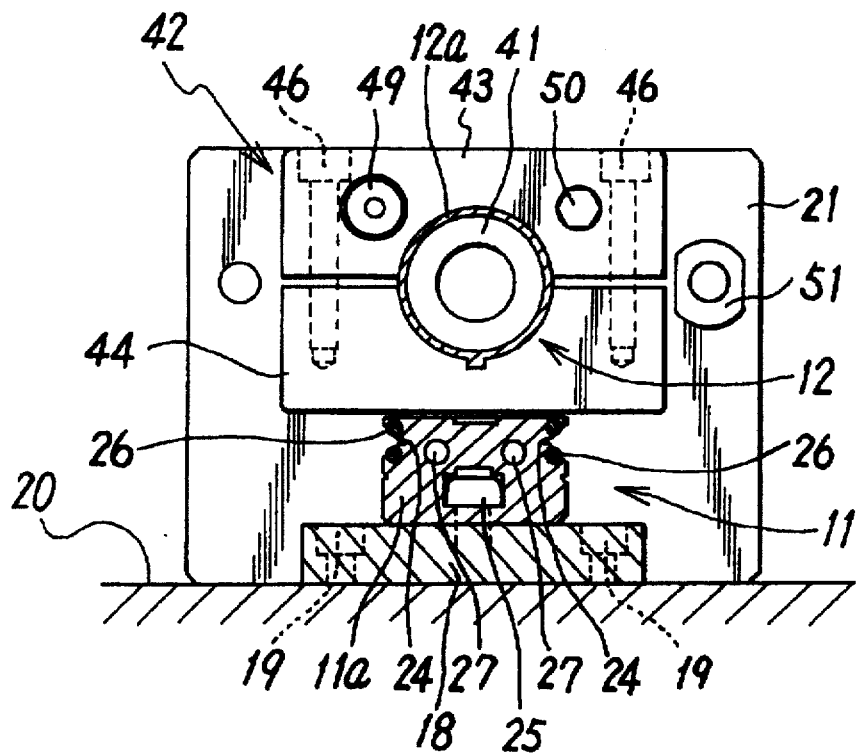
FIG. 4 is a schematic sectional view taken on line IV—IV of FIG. 2.

As seen in FIG. 4, the rail members 11a, 11b, 11c ... 11n, which are originally integrally formed of an extrudate of aluminum or the like, are provided with guide grooves 24 of V-shape on and along opposite lateral sides thereby to guide rollers 56 on the carriage 13. Piano wires 26 are embedded in the opposing walls of each guide groove 24 in a partly exposed state for contact with the rollers 56. Formed internally of each one of the rail members 11a, 11b, 11c ... 11n are bores 27 which can be utilized as fluid passages whenever necessary. In the particular embodiment shown, the ends of the bores 27 are closed by plugs 28 which are threaded into the end plate 21.

Figure 6:
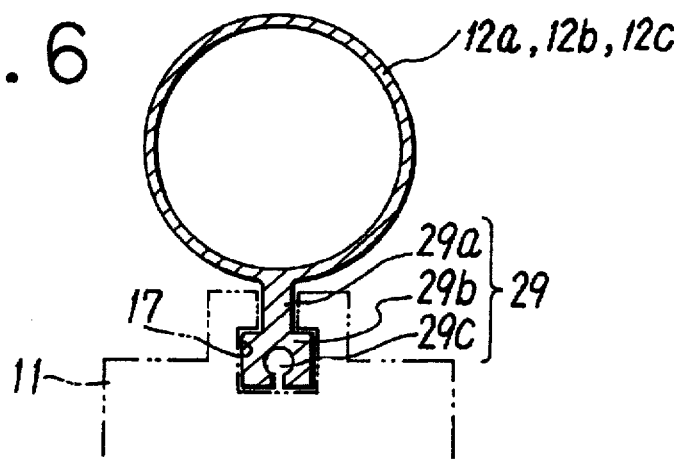
FIG. 6 is a schematic sectional view of a tube member of a cylinder tube assembly.
Figure 7:
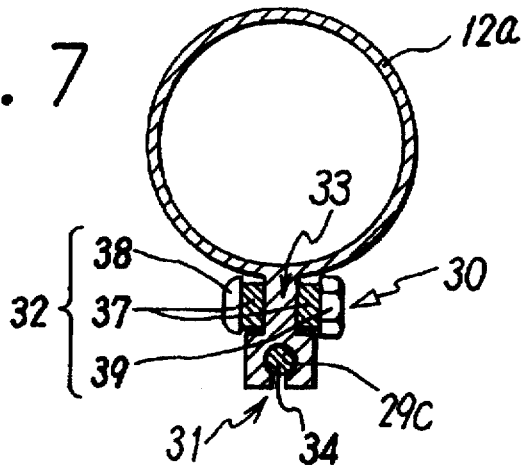
FIG. 7 is a schematic sectional view taken on line VII—VII of FIG. 1.

As shown in FIGS. 6 and 7, each one of the tube members 12a, 12b, 12c ... 12n, which constitute the cylinder tube 12, is integrally provided with an axially extending rib 29, and formed by extrusion molding of non-magnetic material such as aluminum or the like. Except for an end tube member 12a which is positioned at a head or tail end of the cylinder tube 12, the respective tube members 12 are formed in the same length which is slightly longer than the end tube member 12a.

The above-mentioned ribs 29 on the tube members 12 are each provided with a downwardly extending main body 29a, a bulged lower end portion 29b, and a circular groove 29c formed within the bulged lower end portion 29b. These ribs 29 serve as reinforcing means for the cylinder tube 12 and at the same time as means for mounting the cylinder tube 12 fixedly on the guide rail 11 and as fixation means for fixing the tube members in a connected state relative to each other.

Figure 8:
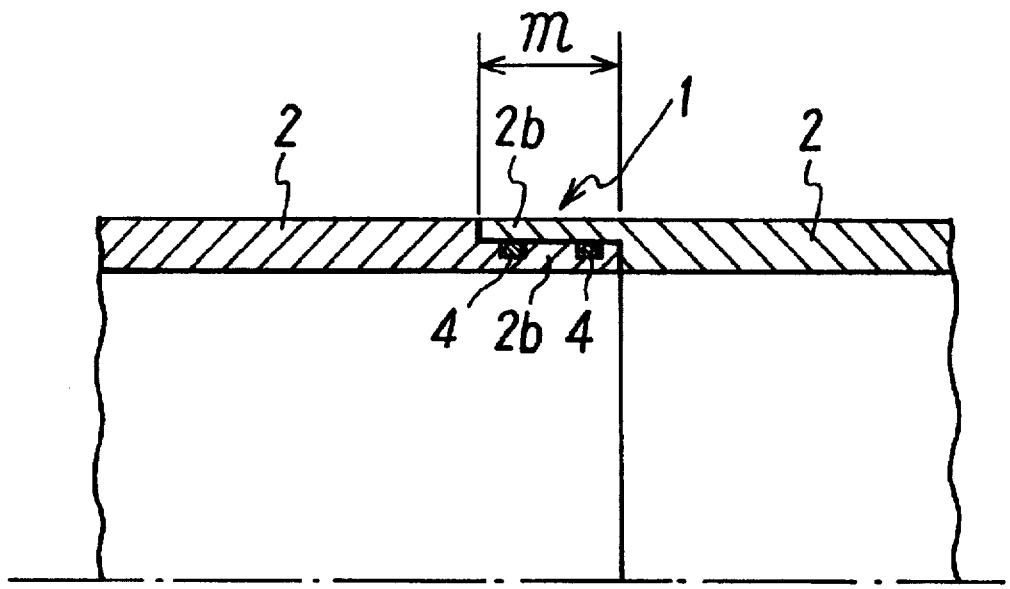
FIG. 8 is a schematic sectional view showing an example of fitting joint for tube members.
Figure 9:
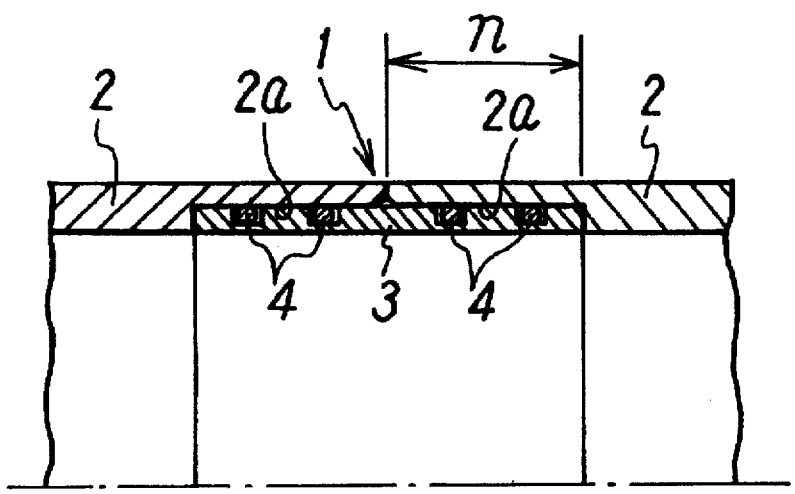
FIG. 9 is a schematic sectional view showing another example of fitting joint.

Similarly to the prior art cylinder tube 1 shown in FIGS. 8 and 9, the tube members 12a, 12b, 12c ... 12n are connected to each other by directly fitting end portions of adjacent tube members or by fitting end portions of adjacent tube member equally on a joint sleeve, and fixed in the connected state by a fixation mechanism 30 utilizing the above-described ribs 30. In case the cylinder tube 12 is constituted by a number of tube members which are successively connected in the manner just described, of course the respective tube members are provided with smooth surfaces on their outer and inner peripheries to ensure smooth movements of the carriage 13 and piston 14.

The above-mentioned fixation mechanism 30 is constituted by fixing portions 33 which are provided in part of the ribs 29 at connecting end portions of the respective tube members 12a, 12b, 12c ... 12n, and first and second fixation means 31 and 32 for fixedly holding the fixing portions 33 in a connected state.

The first fixation means 31 includes a bolt 34 passed axially through grooves 29c in adjacent fixing portions 33 and a nut 35 tightened on the bolt 34. On the other hand, the second fixation means 32 includes brackets 37 located on and astride of lateral sides of adjacent fixing portions 33, bolts 38, and nuts 39 tightened on the bolts to clamp and fix the brackets 37 to each other.

As shown particularly in FIG. 6, the cylinder tube 12 is connected to the guide rail 11 by fitting the bulged lower end portions 29b of the ribs 29 in an anchor groove 17 in an upper end portion of the guide rail 11 with a certain degree of freedom. Except for the above-mentioned end tube member 12a at an end of the cylinder tube 12 and the extractable tube member 12b in the second position next to the end tube member 12a, the tube members 12c in the third position and tube members in inner positions are similarly connected to the guide rail 11 by engagement of the bulged lower end portions 29b of the respective ribs 29 in the anchor grooves 17 of the guide rail 11. Further, except for the fixing portions 33, all of the ribs 29 are cut off from the end tube member 12a and the extractable tube member 12b to make these tube members easily disconnectible from the cylinder tube 12 whenever necessary.

As seen in FIGS. 1 and 4, through a seal member, an end of the cylinder tube 12, namely, the end tube member 12a of the cylinder tube 12 is hermetically and axially slidably fitted on a tubular support member 41 which is projected on the inner side of the end block 21 and which also serves as a conduit for supplying compressed air to the cylinder tube 12. By a releasable stopper means 42 consisting of upper and lower clamp blocks 43 and 44, the end tube 12a is releasably fixed to the tubular support member 41 in a position at a predetermined distance L from an inner side surface of the end block 21.

In this instance, the end tube member 12a is axially displaceable on the support member 41 over a distance L which is at least two times longer than the fitting length "m" in direct fit joints (FIG. 8) of the tube members 12a, 12b, 12c ... 12n or than the fitting length "n" on the joint sleeves (FIG. 9). As a consequence, the extractable tube member 12b can be removed from the cylinder tube 12 by firstly freeing the extractable tube member 12b of the above-described fixation means 30 relative to the end tube member 12a and an intermediate tube member 12c, shifting the end tube member 12a toward the end block 21, and then similarly shifting the extractable tube member 12b toward the end tube member 12a over a distance which is necessary for disengagement from the intermediate tube member 12b.

In the particular embodiment shown, the end tube member 12a has a length which is shorter than that of other tube members by the above-mentioned distance L.

The clamping blocks 43 and 44 are mounted on the inner side surface of the end block 21 slightly movably in the vertical direction for firmly gripping the end tube member 12a from opposite sides, fixing same firmly in position on the tubular support member 41 as the clamping bolt is tightened.

Provided on the end block 21 are an adjustable stopper 50 which determines a stroke end of the above-described carriage 13, and a shock absorber 49 which cushions stopping motions of the carriage 13. Further provided on the end block 21 is an air supply pipe 51 which is connectible through an air supply unit 52 to an air chuck or other pneumatic component unit on the carriage 13 at its stroke end to supply compressed air to such a pneumatic component unit.

Figure 5:
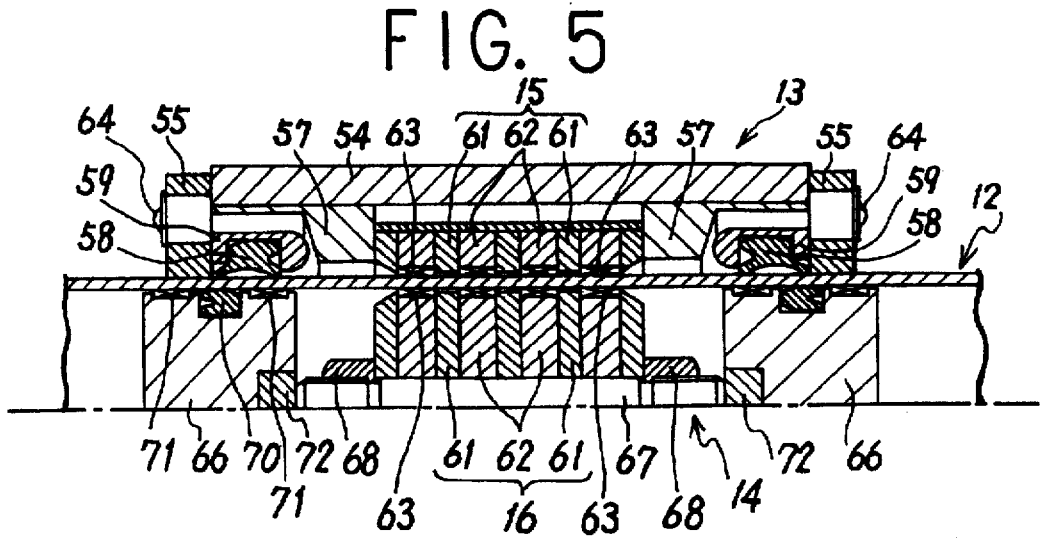
FIG. 5 is a fragmentary sectional view of a reciprocating carriage and a piston of the transfer mechanism.

As shown particularly in FIG. 5, the carriage 13 is provided with a housing 54 astride of the cylinder tube 12, accommodating therein the above-mentioned magnetic coupling member 15. Located on the opposite sides of the magnetic coupling member 15 within the housing 54 are adapter plates 57, and scrapers 58 which are retained in holders 59, respectively. End plates 55 are fixed to the opposite ends of the housing 54 thereby to seal in the respective parts just mentioned. The rollers 56 are rotatably and removably supported at the opposite lateral sides of the housing 54.

Accordingly, after removing one of the end plates 55 of the carriage 13, sliding parts of the carriage 13, more specifically, the above-mentioned magnetic coupling member 15, adapter plates 57 and scrapers 58 can be extracted out of the housing 54 along the cylinder tube 12.

The magnetic coupling member 15 is constituted by a plural number of yokes 61 which are alternately assembled tightly with permanent magnets 62 in the axial direction. Wear rings 63 are fitted on the inner peripheries of the permanent magnets in sliding contact with the outer periphery of the cylinder tube 12, while a small clearance is formed between the yokes 61 and the cylinder tube 12.

Further, grease nipples 64 are provided on the end plate 55 for the purpose of supplying a lubricant like grease to the scrapers 58.

On the other hand, the piston 14 is arranged as a separate piston including the annular magnetic coupling member 16 which is in a center position, and a couple of separate pressure receiving members 66 which are located axially on the opposite sides of the magnetic coupling member 16.

Similarly to the magnetic coupling member 15 on the carriage 13, the magnetic coupling member 16 on the piston 14 is constituted by a plural number of annular yokes 61 which are alternately assembled tightly with permanent magnets 62, by means of a shaft 67, which is passed through a center hole of the yoke and magnet assembly, and nuts 68 which are tightly threaded on the opposite ends of the shaft 67. Annular wear rings 63 are fitted on the outer peripheries of the permanent magnets 62 in sliding contact with the inner periphery of the cylinder tube 12, while a small clearance is provided between the yokes 61 and the cylinder tube 12.

The above-mentioned pressure receiving members 66 are formed of non-magnetic material such as aluminum or the like, and have an axial length shorter than that of the magnetic coupling member 16. Each pressure receiving member 66 has an annular seal member 70 and a wear ring 71 fitted on its outer periphery, in addition to a wear-proof abutment member 72 which is attached on a center portion of its end face on the side of the magnetic coupling member 16.

In the present invention, the respective tube members are preferred to have an axial length greater than those of the carriage 13 and piston 14.

With the article transfer mechanism of the arrangements as described above, upon supplying compressed air to and from the cylinder tube 12 through the tubular support member 41, the piston 14 is moved back and forth within the cylinder tube 12, causing the carriage 13 to reciprocate in step with movements of the piston 14 by magnetic attraction of the magnetic coupling members 15 and 16 in the manner well known in the art.

Should there arise a necessity for removing sliding parts 60 of the carriage 13 or the piston 14 from the cylinder tube for maintenance and service or for other purposes, the carriage 13 and piston 14 are stopped on the extractable tube member 12b as shown in FIG. 1, and, after removing one of the end plates 55 in that position, the housing 54 is moved onto the end tube member 12a as indicated by chain line, leaving the magnetic coupling member 15, adapter plate 57 and scraper 58 on the extractable tube member 12b. At this time, the piston 14 also remains within the extractable tube member 12b due to the magnetic attraction between the magnetic coupling members 15 and 16.

Succeedingly, the extractable tube member 12b, end tube member 12a and intermediate tube member 12c are unfastened by releasing the fixation mechanism 30, namely, by loosening the bolt 46 to relieve the end tube member 12a of the clamping forces of upper and lower clamping blocks 43 and 44. Then, the end tube member 12a is moved in the axial direction toward the end block 21, and similarly the extractable tube member 12b is shifted axially toward the end tube member 12a over a necessary distance for disengagement from the intermediate tube member 12c. By so doing, the extractable tube member 12b can be removed from the cylinder tube 12 along with the sliding parts 60 and piston 14.

Thus, the maintenance and service becomes extremely easy, because on such an occasion there is no need for dismantling the end block 21 which is connected with a large number of pneumatic component units and pipes.

Further, if necessary, the housing 54 of the carriage 13 can be removed from the cylinder tube 12 by extracting same through the freed end of the end tube member 12a after removing rollers 56. However, actually there seldom arises a necessity for removing the housing 54 which normally does not require maintenance and service at all.

In order to dismantle the carriage 13 from the cylinder tube 12 without disassembling its housing and sliding parts 60, firstly the carriage 13 is positioned on the extractable tube member 12b and, after removing the rollers 56, the extractable tube member 12b is disconnected according to the same procedures as described above.

After completing necessary jobs for maintenance and service, the original state of the article transfer mechanism can be easily restored by assembling disconnected parts in a reverse order, starting with the connection to the intermediate tube member 12c of the extractable tube member 12b together with the sliding parts 60 and piston 14 which are fitted on the outer and inner peripheries of the extractable tube member 12b. The end tube member 12a is then moved toward and connected to the extractable tube member 12b, followed by tightening of the fixation mechanism 30, that is, by tightening the bolt 46 of the clamping blocks 43 and 44 to fix the tube members 12a, 12b and 12c in the connected state. Thereafter, the housing 54 of the carriage 13 is moved onto the extractable tube member 12b to assemble therewith the sliding parts 60 and the end plate 55.

Although the foregoing embodiment shows arrangements at one end of the cylinder tube 12, it is preferable to employ the same arrangements at the other end of the cylinder tube.

Thus, according to the present invention, it becomes possible to disconnect part of tube members of the cylinder tube and to dismantle the carriage and piston easily without dismantling the end block, facilitating the maintenance and service of the transfer mechanism extremely easy.

What is claimed is:

1. A rodless cylinder type article transfer mechanism, comprising:
   a cylinder tube composed of a series of tube members successively connected either by direct fitting engagement or by indirect fitting engagement through joint sleeves;
   a pair of end blocks supporting the opposite ends of said cylinder tube;
   a piston slidably received in said cylinder tube;
   a reciprocating carriage movably mounted on the outer periphery of said cylinder tube; and
   magnetic coupling members provided on said piston and carriage for magnetically coupling said carriage with said piston and letting said carriage move back and forth along the outer periphery of said cylinder tube following movements of said piston;
   said cylinder tube having at least at one end thereof an end tube member releasable for an axial displacement toward one end block over a predetermined distance at least two times longer than a length of fitting engagement of said tube members of said cylinder tube.

2. A rodless cylinder type article transfer mechanism as defined in claim 1, wherein said end tube member is hermetically and slidably fitted on a support member provided on said one end block and releasably fixed in a predetermined position on said support member by a stopper means, said support member being in the form of a pipe and serving also as a conduit for supplying compressed air to and from said cylinder tube.

3. A rodless cylinder type article transfer mechanism as defined in claim 2, wherein said stopper means is constituted by a pair of clamping blocks releasably fastened to the opposite sides of said end tube member.

4. A rodless cylinder type article transfer mechanism as defined in claim 1, wherein said carriage is provided with a housing accommodating said magnetic coupling member, said housing being separable from said magnetic coupling member in the longitudinal direction of said cylinder tube.

* * * * *